United States Patent [19]

Vershure, Jr. et al.

[11] Patent Number: 4,965,995
[45] Date of Patent: Oct. 30, 1990

[54] POWER UNIT WITH STORED ENERGY

[75] Inventors: Roy W. Vershure, Jr., Escondido, Calif.; Kent Weber, Rockford, Ill.

[73] Assignee: Sundstrand Corporation, Rockford, Ill.

[21] Appl. No.: 248,985

[22] Filed: Sep. 26, 1988

[51] Int. Cl.⁵ .............................................. F23R 3/00
[52] U.S. Cl. .................... 60/39.142; 60/727
[58] Field of Search ............ 60/727, 39.06, 39.142, 60/39.823, 726

[56] References Cited

U.S. PATENT DOCUMENTS

| | | |
|---|---|---|
| 693,871 | 2/1902 | Leavitt . |
| 2,842,937 | 7/1958 | Clark .............................. 60/39.142 |
| 3,238,721 | 3/1966 | Brardes et al. .................... 60/39.142 |
| 3,675,417 | 7/1972 | Shum, Jr. .......................... 60/39.142 |
| 4,777,793 | 10/1988 | Wergard et al. ...................... 60/727 |

Primary Examiner—Louis J. Casaregola
Assistant Examiner—Timothy S. Thorpe
Attorney, Agent, or Firm—Wood, Phillips, Mason, Recktenwald & VanSanten

[57] ABSTRACT

The weight of a high pressure storage vessel 20 for an oxidant used to oxidize fuel in a combustor 12 which in turn provides gases of combustion to a turbine wheel 10 may be minimized by providing an incendiary device 32 within the vessel 20 which is triggered by a sensor 34, 36 in response to some sensed characteristic of the oxidant within the vessel 20 to increase the pressure within the vessel 20 and to drive the oxidant to the combustor 12.

7 Claims, 1 Drawing Sheet

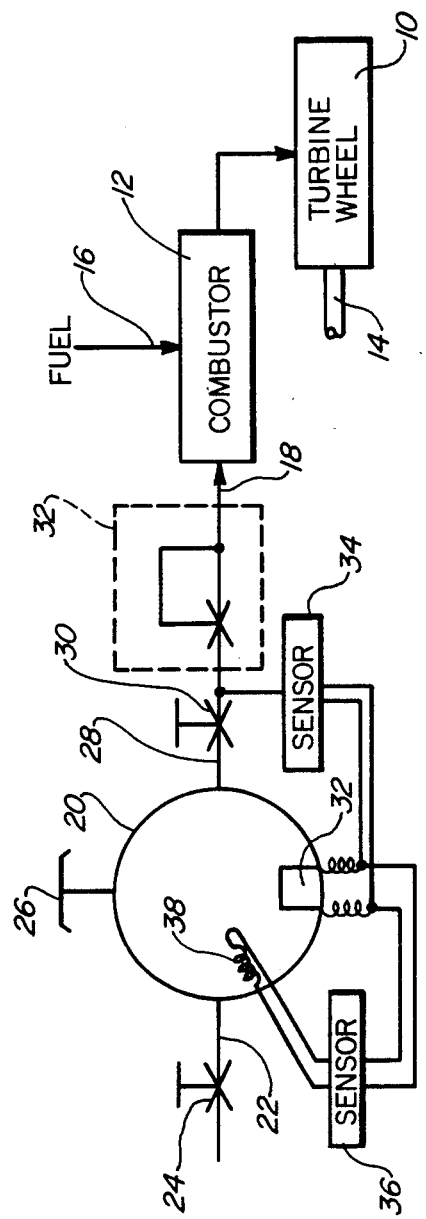

POWER UNIT WITH STORED ENERGY

FIELD OF THE INVENTION

This invention relates to a power unit such as a turbine that may be operated at high altitudes utilizing stored energy.

BACKGROUND OF THE INVENTION

Increased sophistication in aircraft has resulted in so-called "fly-by-wire" aircraft wherein the controls operated by the pilot and control surfaces responsive to the controls are not directly mechanically coupled. Rather, the same may be coupled by electrical or hydraulic systems. That in turn requires that electrical or hydraulic energy be available at all times or else the link between the controls and the control surfaces is lost.

Consequently, such aircraft require advanced airborne secondary power systems. Particularly when used in military applications, such secondary power systems must be capable of operation at remote sites with a minimum use of special ground support equipment. In addition, the same must be capable of virtually instant start up from an inactive position, whether at sea level or at extremely high altitudes in excess of 50,000 feet.

Frequently the power systems include power units known as auxiliary power units or emergency power units or combinations of both. These units generally provide useful work as an output from a turbine engine which in turn is normally driven by gases of combustion.

While this presents no difficulties in most instances, at high altitudes, where the air is least dense meaning that a given volume has a minimal quantity of oxygen, starting of such power units in such a way that energy therefrom will be available to operate control surfaces in response to control commands within an elapsed time of two or three seconds, difficulties are encountered.

One prior art proposal for avoiding the difficulty includes the use of hydrazine which is stored on board the aircraft. The hydrazine is applied to a catalytic chamber wherein it decomposes and generates gas under pressure sufficient to drive a turbine wheel and accelerate the same to the point where its operation can become self sustaining at altitude. While this works well, storage of unstable material such as hydrazine aboard aircraft is not desired and the same requires special handling and may not be readily available for use at remote sites.

The present invention is directed to overcoming the above problems.

SUMMARY OF THE INVENTION

It is the principal object of the invention to provide a new and improved power unit that is adapted for use in aircraft as a secondary power system. More particularly, it is an object of the invention to provide such a power unit that is self sufficient and capable of providing rapid starts of turbine engines in a wide variety of environments and which is capable of operation and servicing in remote sites with a minimum of ground support equipment.

An exemplary embodiment of the invention achieves the foregoing objects in a system including a combustor for receiving fuel and an oxidant and combusting the same to provide gases of combustion. A turbine wheel is provided and is adapted to receive the gases of combustion and produce useful work. The turbine wheel is connected to the combustor. Means are provided for supplying fuel to the combustor along with means for supplying an oxidant thereto. The oxidant supplying means include a high pressure storage vessel for receiving and storing the oxidant, valve means that are selectively operable to control the flow of oxidant from the vessel to the combustor, an incendiary device in the vessel which is operable to produce an increase in oxidant pressure within the vessel, and a sensor for triggering the incendiary device when a predetermined characteristic of the oxidant is observed.

In a preferred embodiment of the invention, the incendiary device is an explosive containing its own oxidant so that it is operable to produce an increase in the oxidant pressure within the vessel without consuming the stored oxidant therein thereby allowing the oxidant in the vessel to be used fully for combusting fuel to drive the turbine.

In one embodiment of the invention, the sensed characteristic is pressure related. In another embodiment of the invention, the sensed characteristic is temperature related.

A preferred embodiment of the invention contemplates that the valve means include a flow control valve and a pressure regulator and the sensor is upstream of the pressure regulator.

In addition, it is preferred that the vessel include a burst disc and the same may be additionally provided with an inlet connectable to a recharge compressor where the oxidant is air or oxygen enriched air.

Other objects and advantages will become apparent from the following specification taken in connection with the accompanying drawings.

DESCRIPTION OF THE DRAWINGS

The FIGURE is a schematic view of a power unit made according to the invention.

DESCRIPTION OF THE PREFERRED EMBODIMENT

An exemplary embodiment of a power unit made according to the invention is illustrated in the FIGURE and is seen to include a turbine wheel 10 that is adapted to be rotated by gases of combustion received from a conventional combustor 12. An output shaft 14 from the turbine 10 may be connected to a generator, a pump, combinations thereof, etc. to produce power that may be utilized as desired.

The combustor includes one or more fuel injectors schematically illustrated at 16 as well as one or more inlets schematically illustrated at 18 for an oxidant. In a preferred embodiment, the oxidant will be air or oxygen enriched air although in some instances, it may be molecular oxygen.

The invention contemplates the provision of unique means for supplying the oxidant to the inlet 18. In particular, there is provided a high pressure storage vessel shown schematically at 20 which will typically store the oxidant at pressures on the order of, say, 4500 psi. The oxidant may be introduced into the vessel 20 through an inlet 22 controlled by a valve 24 which may be connected to a recharge compressor (not shown). The recharge compressor may be part of the aircraft itself or may be part of ground support equipment, or both.

The vessel 20 is provided with a burst disc shown schematically at 26. The burst disc 28 is a safety device and is designed to burst and relieve pressure within the vessel 20 when some predetermined pressure level has been exceeded.

The vessel 20 includes an oxidant outlet 28 and flow therefrom is controlled by a flow control valve 30. The flow control valve is then connected to a pressure reducing and/or regulating valve 32 which provides oxidant to the inlet 18 at a constant pressure, say, 600 psi.

According to the invention, an incendiary device 32 is disposed within the vessel 20. The incendiary device 32 preferably is an explosive device such that when triggered, it will cause a pressure rise within the vessel 20. The pressure rise may be a result of the explosion of the material of the device 32 or it may result from the heating of the oxidant contained within the vessel 20 when the incendiary device 32 is triggered, or both.

In a highly preferred embodiment, any one of those types of incendiary devices 32 that contain a fuel and a stoichiometric quantity of oxidant for that fuel is utilized. In this way, the firing of the incendiary device 32 does not consume any of the oxidant stored within the vessel 20, leaving such oxidant for use in combusting fuel within the combustor 12.

The incendiary device 32 may be triggered in either one or both of two ways. According to a preferred embodiment of the invention, a pressure sensor 34 is connected to the outlet 28 at a location upstream of the pressure regulator 32 so that it can sense the pressure within the vessel 20 when the system is operative. When the pressure drops to some particular level that is insufficient to provide the desired flow rate of oxidant to the combustor 12, the incendiary device 32 is fired by the sensor 34.

Alternatively, or even additively, a second sensor 36 including a temperature sensing probe 38 within the vessel 20 may be utilized to trigger the incendiary device 32. Temperature sensing is a viable means of sensing the need for operation of the incendiary device 32 since at high altitudes where turbine starting may be a problem, cold temperatures are present and may result in a lowering of the pressure within the vessel 20.

In a typical case, the vessel 20 may contain enough oxidant to assure, say, three starts of the turbine 10. In the process of the first start, and even in the process of accomplishing the second start, there will typically be enough residual pressure within the vessel 20 such that the incendiary device 32 need not be operated. However, in the third start, it may be necessary to fire the incendiary device 32 to provide sufficient pressure to drive the remaining oxidant from the vessel 20 to the inlet 18.

Typically, the incendiary device 32 may be fired when the available oxidant mass within the vessel 20 is approximately 50% of the original amount. This is required due to the rapid temperature and pressure drop that will occur in the oxidant as a result of the expansion process that results when the valve 30 is opened. The firing of the incendiary device 32 will then increase the usable quantity of oxidant within the vessel 20 from approximately 50% to approximately 85%. This in turn permits the vessel 20 to be down sized from what it would otherwise be without the incendiary device 32.

Given the pressure resistance requirements of the vessel 20, such down sizing produces a substantial weight savings which is highly desirable in aircraft.

Another desirable feature of the invention is that, to the extent oxidant within the vessel 20 may be in the liquid phase, the heat generated by the incendiary device 32 will cause the same to vaporize to more fully empty the vessel 20.

We claim:

1. A power unit comprising:
   a combustor for receiving a fuel and an oxidant and combusting the same to provide gases of combustion;
   a turbine wheel adapted to receive gases of combustion and produce useful work, said turbine wheel being connected to said combustor;
   means for supplying fuel to said combustor; and
   means for selectively supplying an oxidant to said combustor including a high pressure storage vessel for receiving and storing the oxidant, valve means selectively operable to control the flow of oxidant from aid vessel to the combustor, an explosive means in said vessel and operable to produce an increase in pressure within said vessel without consuming oxidant therein, and a sensor for triggering said explosive device when a predetermined characteristic of the oxidant is sensed.

2. The power unit of claim 1 wherein said characteristic is temperature related.

3. The power unit of claim 1 wherein said characteristic is pressure related.

4. The power unit of claim 1 wherein said valve means comprises a flow control valve and a pressure regulator, said sensor being upstream of said pressure regulator.

5. The power unit of claim 1 wherein said vessel includes a burst disc.

6. A power unit comprising:
   a combustor for receiving a fuel and an oxidant and combusting the same to provide gases of combustion;
   a turbine wheel adapted to receive gases of combustion and produce useful work, said turbine wheel being connected to said combustor;
   means for supplying fuel to said combustor; and
   means for selectively supplying an oxidant to said combustor including a high pressure storage vessel for receiving and starting the oxidant, valve means selectively operable to control the flow of oxidant from said vessel to the combustor, an oxidant containing incendiary means in said vessel operable to produce an increase in oxidant pressure within said vessel and a sensor for triggering said incendiary device when a predetermined characteristic of the oxidant is sensed.

7. The power unit of claim 6 wherein said characteristic is pressure or temperature related and said valve means comprises a flow control valve and a pressure regulator, said sensor being upstream of said pressure regulator, said vessel further including a burst disc and an inlet connectable to a recharge compressor.

* * * * *